United States Patent
Suresh et al.

(10) Patent No.: US 12,448,850 B2
(45) Date of Patent: Oct. 21, 2025

(54) BEARING MATERIALS FOR TRICONE BIT ROLLING ELEMENTS

(71) Applicant: Caterpillar Inc., Peoria, IL (US)

(72) Inventors: Swetha Suresh, Chennai (IN); Gary C. Yerby, Morton, IL (US); Chetan V. Dahiwal, Chennai (IN); Thomas J. Yaniak, Peoria, IL (US); Michael A. Pershing, Washington, IL (US); Todd M. Blindt, Canton, IL (US); Scott A. Johnston, East Peoria, IL (US); Timothy F. Nusz, Wyoming, IL (US); Akilan Appavu, Chennai (IN); Benjamin J. Bargfrede, Chicago, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/293,064

(22) PCT Filed: Jul. 20, 2022

(86) PCT No.: PCT/US2022/037656
§ 371 (c)(1),
(2) Date: Jan. 29, 2024

(87) PCT Pub. No.: WO2023/009357
PCT Pub. Date: Feb. 2, 2023

(65) Prior Publication Data
US 2024/0337160 A1 Oct. 10, 2024

(30) Foreign Application Priority Data
Jul. 29, 2021 (IN) .............................. 202111034145

(51) Int. Cl.
*E21B 10/22* (2006.01)

(52) U.S. Cl.
CPC .................................. *E21B 10/22* (2013.01)

(58) Field of Classification Search
CPC .. E21B 10/22; F16C 2202/04; F16C 2204/62; F16C 2204/72; F16C 2223/30;
(Continued)

(56) References Cited

U.S. PATENT DOCUMENTS

| 4,021,084 A | 5/1977 | Garner |
|---|---|---|
| 4,303,137 A | 12/1981 | Fischer |

(Continued)

FOREIGN PATENT DOCUMENTS

| JP | 2005273759 A | 10/2005 |
|---|---|---|
| JP | 6368271 B2 | 8/2018 |

OTHER PUBLICATIONS

International Search Report related to Application No. PCT/US2022/037656; reported on Oct. 28, 2022.
(Continued)

*Primary Examiner* — Yanick A Akaragwe

(57) ABSTRACT

Roller cone drill bits and methods of increasing the wear resistance of a roller cone drill bit are disclosed. The roller cone drill bit includes a plurality of rolling elements within a bearing assembly of a cone. Each rolling element of the plurality of rolling elements may have a surface hardness of HRC 59-63, a hardened depth that is 0.5 mm to 3.0 mm deep, and may be derived from a low carbon bearing steel material. The hardened depth is measured from the surface of each rolling element and the low carbon bearing steel material has, by weight percent, from 0.12% to 0.25% carbon.

11 Claims, 7 Drawing Sheets

(58) Field of Classification Search
CPC .. F16C 2240/60; F16C 2352/00; F16C 19/16; F16C 19/546; F16C 33/32; F16C 33/34; F16C 19/26; C21D 9/22; C21D 1/09; Y10S 148/906; Y10S 148/903; Y10S 148/905

See application file for complete search history.

(56) References Cited

U.S. PATENT DOCUMENTS

| | | |
|---|---|---|
| 7,395,884 B2 | 7/2008 | Kembaiyan et al. |
| 7,469,618 B2 | 12/2008 | Bandi |
| 9,273,518 B2 | 3/2016 | Smith et al. |
| 10,519,720 B2 | 12/2019 | Benes et al. |
| 10,619,419 B2 | 4/2020 | Williams et al. |
| 10,815,732 B2 | 10/2020 | Digiovanni et al. |
| 2009/0308662 A1* | 12/2009 | Lyons .................. E21B 10/50 419/37 |
| 2012/0273282 A1 | 11/2012 | Lin et al. |
| 2017/0275950 A1 | 9/2017 | Spencer et al. |

OTHER PUBLICATIONS

Indian Detailed Technical Report related to Application No. 202111034145.

* cited by examiner

BEARING MATERIALS FOR TRICONE BIT ROLLING ELEMENTS

CROSS-REFERENCE TO RELATED APPLICATION

This application is a USC § 371 US National Stage filing International Application No. PCT/EP2022/037656 filed on Jul. 20, 2022 which claims priority under the Paris Convention to Indian Patent Application number 202111034145 filed on Jul. 29, 2021.

TECHNICAL FIELD

The present disclosure relates generally to rolling elements, and more particularly, to tricone bit rolling elements and to bearing materials used to manufacture said rolling elements.

BACKGROUND

Tricone bits, also referred to as tricone drill bits, rolling cutter bits, or roller-cone bits, are used in a variety of drilling applications. A tricone bit includes three separate leg assemblies, which each face inward. Each leg assembly contains a rotatable cone assembly which is covered with teeth or inserts that cut into a material, as the cone assemblies rotate around the leg assemblies during the drilling process. Rolling elements, such as balls and rollers are located inside each cone of the leg assemblies in rows forming raceways for the rolling elements to move during rotation. Together the rolling elements and raceways form a bearing or bearing assembly. The rolling elements help to reduce sliding friction and act as a buffer to allow free rotation of each cone assembly of a tricone bit.

High contact stresses are generated on the rolling elements and raceways of the tricone bit during the drilling process. Further, because the working environment is not sealed, the bearings are susceptible to damage from the drilling and debris generated. Water may also be present in the system in some instances. These factors are all detrimental to the life of the rolling elements and raceways of the bearings. Moreover, these factors are also detrimental to the life and efficiency of a tricone bit comprising the bearings and rolling elements therein.

Japanese Patent Application Publication published to Tanaka on Oct. 6, 2005 ("Tanaka"), describes a rolling supporting device or rolling bearing made of a steel material, which is subjected to a carburizing process, ausforming, shaping, heating to no more than the A1 transformation point, quenching and tempering. However, Tanaka may not adequately ensure that the rolling elements within the rolling supporting device have increased hardness, increased wear resistance, and increased surface contact fatigue lifespan. Furthermore, Tanaka may not adequately ensure that the rolling elements within the rolling supporting device impart the properties of increased hardness, increased wear resistance, and increased surface contact fatigue lifespan to roller cone bits, such as tricone bits, which may contain said rolling elements.

The rolling elements, bearing materials used in the rolling elements, bearings, roller cone (e.g., tricone) bit, and process of making the same of the present disclosure may solve one or more of the problems in the art. The scope of the current disclosure, however, is defined by the attached claims, and not by the ability to solve any specific problem.

SUMMARY

In one aspect, a roller cone drill bit is disclosed. The roller cone drill bit includes a plurality of rolling elements within a bearing assembly of a cone. Each rolling element of the plurality of rolling elements may have a surface hardness of HRC 59-63, a hardened depth that is 0.5 mm to 3.0 mm deep, and may be derived from a low carbon bearing steel material. The hardened depth is measured from the surface of each rolling element and the low carbon bearing steel material has, by weight percent, from 0.12% to 0.25% carbon.

In another aspect, a tricone bit is disclosed. The tricone bit includes three leg assemblies each including a rotatable cone. Each rotatable includes a plurality of coated rolling elements within a bearing assembly. Each rolling element of the plurality of coated rolling elements has a surface hardness of HRC 59-63, a hardened depth that is 0.5 mm to 3.0 mm deep, a diamond-like carbon coating, and is derived from a low carbon bearing steep material. The hardened depth is measured from the surface of each rolling element and the low carbon bearing steel material has, by weight percent, from 0.12% to 0.25% carbon.

In another aspect, a roller cone drill bit is disclosed. The roller cone drill bit includes a plurality of rolling elements within one or more cones. Each rolling element of the plurality of rolling elements has a surface hardness of HRC 58-63, a core hardness of HRC 56-59, and is derived from S2 steel material. The S2 steel material has, by weight percent, from 0.40% to 0.55% carbon.

In another aspect, a method of increasing the wear resistance of a roller cone drill bit is disclosed. The method includes adding a plurality of rolling elements to a bearing assembly within at least one cone of the roller cone drill bit. Each rolling element of the plurality of rolling elements may have a surface hardness of HRC 59-63, a hardened depth that is 0.5 mm to 3.0 mm deep, and may be derived from a low carbon bearing steel material. The hardened depth is measured from the surface of each rolling element and the low carbon bearing steel material has, by weight percent, from 0.12% to 0.25% carbon.

In yet another aspect, a method of increasing the wear resistance of a roller cone drill bit is disclosed. The method includes adding a plurality of rolling elements to a bearing assembly within at least one cone of the roller cone drill bit. Each rolling element of the plurality of rolling elements has a surface hardness of HRC 58-63, a core hardness of HRC 56-59, and is derived from S2 steel material. The S2 steel material has, by weight percent, from 0.40% to 0.55% carbon.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," "substantially," and "approximately" are used to indicate a possible variation of ±10% in the stated value. Although the current disclosure will be described with reference to a tricone bit and tricone bit rolling elements, this is only exemplary. For instance, the current disclosure can be applied to components of any type of bit, such as roller cone bits, including not limited to, two cone bits and engineering bits.

Tricone bits of the present disclosure may be used in a variety of drilling applications. Exemplary drilling applications include applications within the following fields: oil, mining, construction, geothermal, tunnel boring, and water well excavation.

Figure 1:
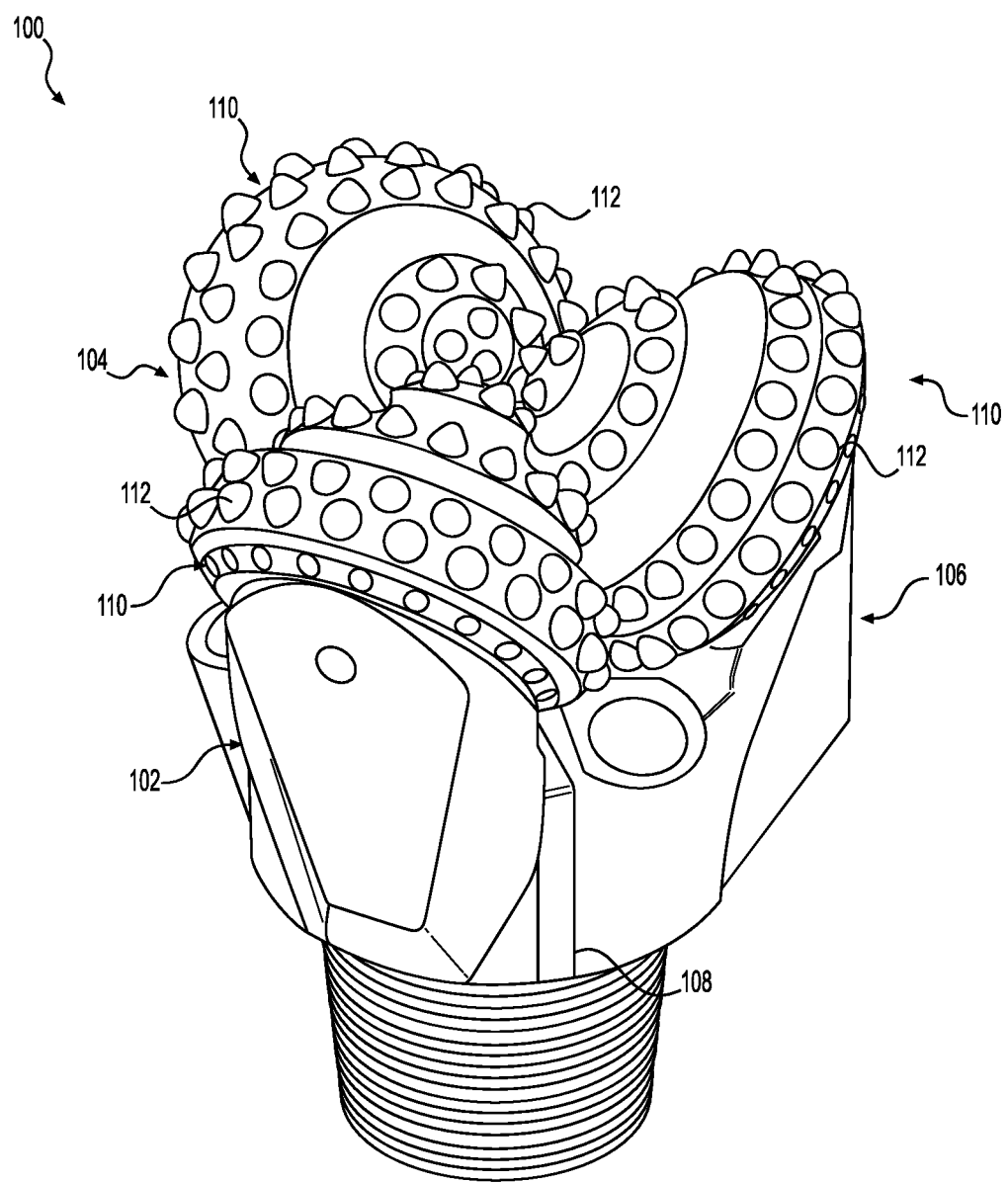
FIG. 1 illustrates a perspective view of an exemplary tricone bit, according to aspects of the present disclosure.

FIG. 1 illustrates a perspective view of an exemplary tricone bit 100, according to the present disclosure. Tricone bit 100, contains leg assemblies 102, 104, and 106, which are joined together by welds 108 to form a tricone bit. Each leg assembly 102, 104, and 106, contains a rotatable cone 110. Each cone 110 has a plurality of inserts 112 that cut into a material, as cone 110 of leg assemblies 102, 104, and 106 rotate during a drilling process.

Each cone of the tricone bit according to the present disclosure may contain bearings including a plurality of rolling elements moving within inner and outer bearing races or raceways. A bearing may constrain relative motion to only the desired motion, and may reduce friction between moving parts. In tricone bits of the present disclosure, the rolling elements in each cone may provide for free rotation around the axis of the cone. Without being bound by theory, it is believed that rolling elements reduce rotational friction and may support radial and axial loads. Exemplary types of bearings include roller bearings and ball bearings. Roller bearings may have rolling elements with a cylindrical, barrel, or tapered shape (hereinafter referred to as rollers), and ball bearings may have rolling elements in a spherical, ball-like shape (hereinafter referred to as balls). The rollers and balls of the bearings will be collectively referred to hereinafter as the rolling elements of the bearing.

The balls and/or rollers that are used in the cone of a tricone bit may be located between two races. The two races may form a raceway that contains the rolling elements and may transmit loads through the rolling elements. Without being bound by theory, it is believed that as one of the races rotates it causes the rolling elements to rotate as well. Therefore, the rolling elements of the present disclosure may move along the raceway during rotation.

In some embodiments, the tricone bit may function by one of four different kinds of bearings. The bearings may be open roller bearings, air-cooled roller bearings, sealed roller bearings, and sealed journal bearings. A tricone bit with open roller bearings does not have a seal, and may allow rock and debris to enter into the cone. An air-cooled roller bearing tricone bit may employ high pressure air that travels down air passages into the tricone bearing, which may help to lubricate, cool, and remove particles from the tricone. A sealed roller bearing tricone bit may be sealed with any type of seal, including but not limited to an O-ring, and may be equipped with a lubrication and compensator system which may give it the ability to control leakage. A sealed journal bearing tricone bit may be configured to use a journal which rotates freely in a sleeve.

Figure 2:
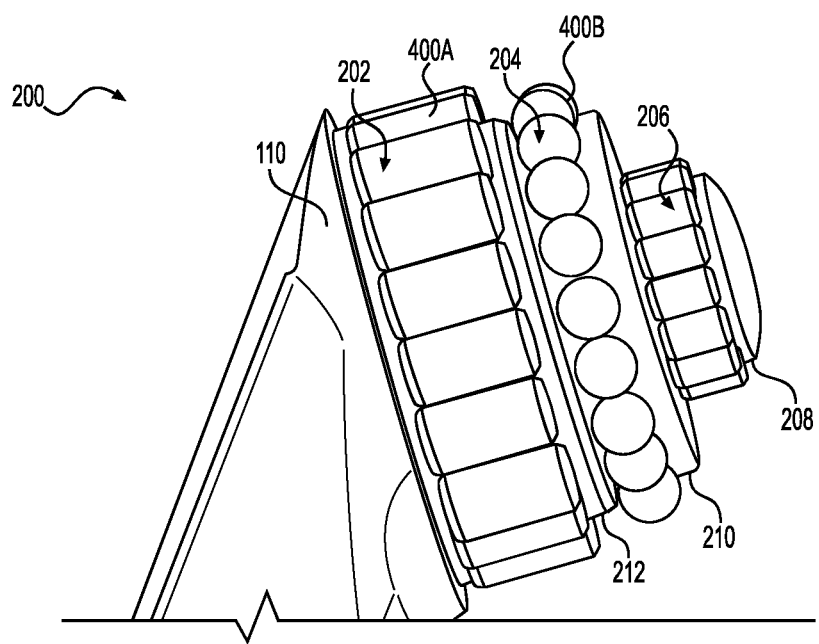
FIG. 2 illustrates a perspective view of an exemplary internal configuration of rolling elements arranged in a journal of a leg assembly of a tricone bit, according to aspects of the present disclosure.

FIG. 2 illustrates a perspective view of an exemplary internal configuration 200 of a leg assembly such as leg assembly 102 of a tricone bit, according to the present disclosure. FIG. 2 depicts an underlying configuration of cone 110 of FIG. 1. Leg assembly 102 contains three separate rows of bearings, depicted as rows 202, 204, 206. Rows 202 and 206 contain roller bearings having a plurality of rolling elements as rollers. Row 204 contains a ball bearing having a plurality of rolling elements as balls. The rollers in row 202 are shown located within an inner raceway 212. The balls in row 204 are shown located within an inner raceway 210, and the rollers in row 206 are shown located within an inner raceway 208. Leg assembly 102 forms the inner raceways for the bearing rows 202, 204 and 206.

Figure 3:
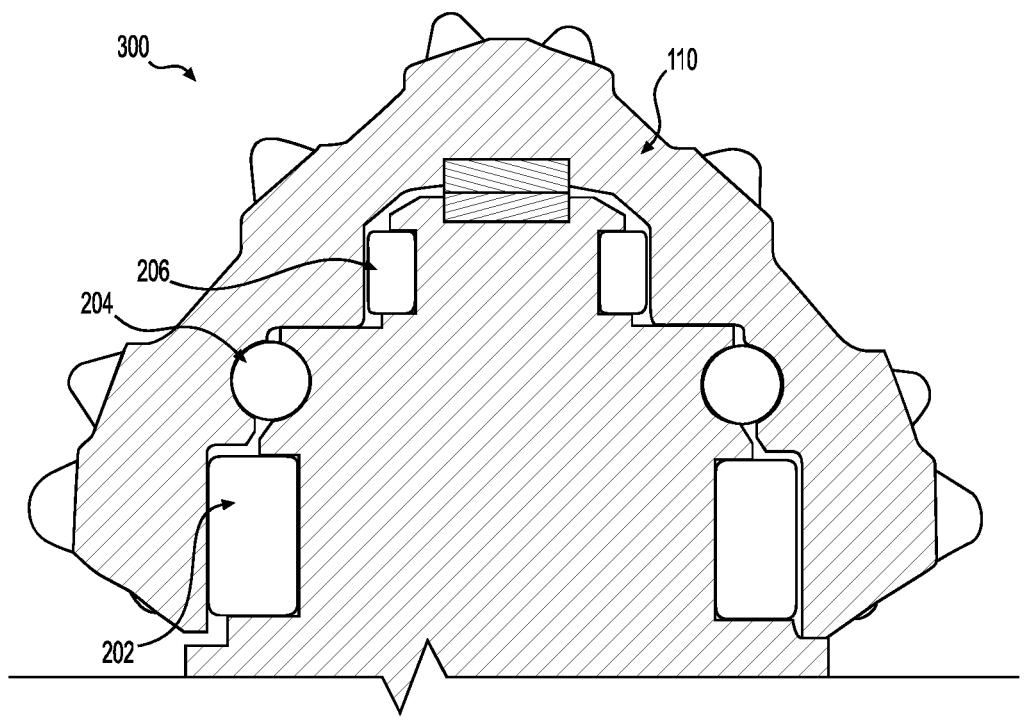
FIG. 3 illustrates a cross-sectional view of an exemplary cone of a tricone bit containing rolling elements, according to aspects of the present disclosure.

FIG. 3 illustrates a cross-sectional view 300 of an exemplary cone 110 of a tricone bit containing bearing rows 202, 204, 206. The internal portion of cone 110 form the outer raceways for bearing rows 202, 204, 206.

Figure 4A:
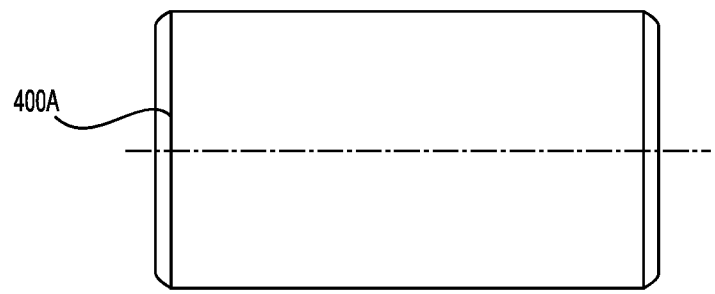
FIGS. 4A and 4B illustrate two exemplary rolling element shapes for tricone bits, according to aspects of the present disclosure.
Figure 4B:
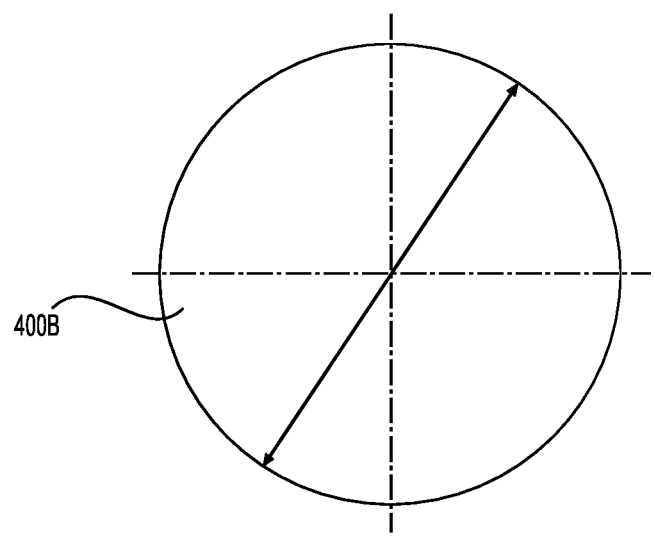

FIGS. 4A and 4B illustrate exemplary shapes for the rolling elements of the bearings of the tricone bits according to the present disclosure. In particular, FIG. 4A depicts an exemplary cylindrical shape of a roller 400A used in bearing rows 202 and 206. FIG. 4B depicts an exemplary spherical shape of a ball 400B used in bearing row 204.

The rolling elements of the present disclosure may be made out of steel. The steel rolling elements may be processed according to various methods, which may comprise a heat treatment process, such as carburization or through hardening. The processing methods may be used to strengthen the rolling elements and to increase the wear resistance. Carburization according to the present disclosure generally entails a low carbon steel being placed in an atmosphere containing carbon in an amount greater than the base carbon content of the steel, and heated to a temperature above the austenite transformation temperature of steel. After the desired amount of carbon has been diffused into the steel to a predetermined depth, surface hardness is induced by cooling the steel, e.g., quenching. Through hardening according to the present disclosure generally entails a medium or high carbon steel being placed in an atmosphere containing a high amount of carbon, heat treated, rapidly cooled (e.g., quenching) to induce hardness throughout, and reheated or tempered.

The desired qualities of rolling elements of the present disclosure are high hardness and high toughness (impact resistance). Without being bound by theory, it is believed that carburizing a low carbon core (steel) material to be used as a material for a rolling element may increase the toughness of the material, providing high toughness to the overall rolling element. Alternatively, higher carbon containing steels, such as S2-shock absorbing tool steel material, may be carburized to provide a shallow carburized layer on the S2 material having high hardness and high toughness. Furthermore, without being bound by theory, it is also believed that through hardening an S2 material to be used as material for a rolling element may maintain a high impact resistance of the material, providing high toughness to the overall rolling element.

Figure 5:
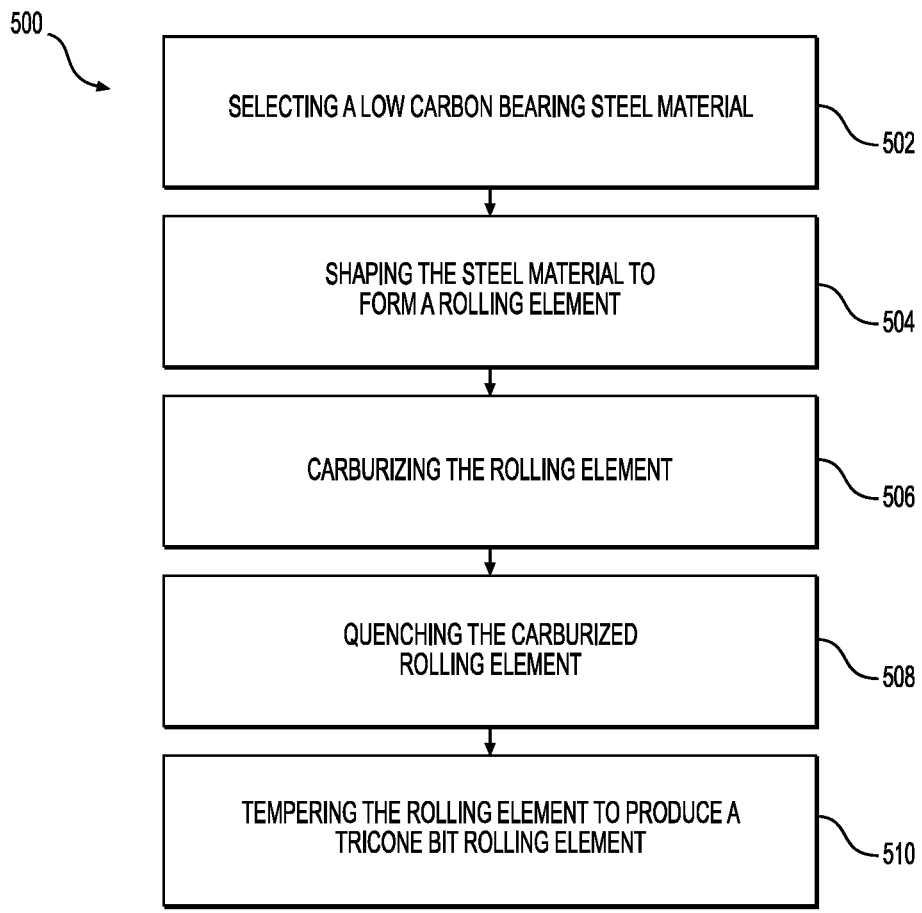
FIG. 5 provides a flowchart depicting an exemplary process for preparing rolling elements for a tricone bit, according to aspects of this disclosure.

FIG. 5 is a flow diagram portraying an exemplary heat treatment-carburization process 500 that may be performed to heat treat a steel rolling element, such as roller 400A of FIG. 4A or ball 400B of FIG. 4B.

Process 500 includes a step 502, in which an initial, base steel material is selected. In process 500, a low carbon bearing steel material may be selected for treatment. The low carbon bearing steel material selected may meet the standards set forth by ASTM A534. An exemplary base low carbon bearing steel material may have a composition, by weight percentage, as presented in Table 1 below:

TABLE 1

Chemical Composition

| | |
|---|---|
| Carbon (C) | 0.12%-0.23% |
| Manganese (Mn) | 0.25-1.40% |
| Silicon (Si) | 0.0%-0.040% |
| Sulfur (S) | 0.0%-0.015% |
| Molybdenum (Mo) | 0.08%-0.30% |
| Chromium (Cr) | 0.30%-1.45% |
| Phosphorus (P) | 0%-0.025% |
| Nickel (Ni) | 0%-1.40% |
| Copper (Cu) | 0%-0.30% |
| Oxygen (O) | 0%-0.0020% |
| Aluminum (Al) | 0%-0.050% |
| Iron (Fe) | Balance |

In some other exemplary embodiments, the low carbon bearing steel material may comprise 0.12 to 0.25% carbon by weight. The low carbon bearing steel material composition may also have a minimum of 0.015% aluminum by weight.

As shown in Table 1, the low carbon bearing steel material that may be selected in step 502, may have a maximum oxygen content of 20 PPM. A maximum total oxygen content of 20 PPM may indicate that the low carbon bearing steel selected in step 502 satisfies steel cleanliness requirements. For example, maintaining cleanliness may ensure that the steel selected is free from oxides, sulfides, and scalings. In order to ensure that the low carbon bearing steel material selected, satisfies cleanliness standards, the steel material may be selected from a low carbon bearing steel material that has been ladle refined and vacuum degassed. In addition, the low carbon bearing steel selected in step 502, may be a low carbon bearing steel that has a grain size of ASTM 5. In some embodiments, the low carbon bearing steel material may comprise a low carbon, low alloy steel.

Process 500 also includes a step 504, in which the low carbon bearing steel material is shaped to form a rolling element, such as roller 400A of FIG. 4A or ball 400B of FIG. 4B. The manner or mechanism by which the steel material is shaped is not particularly limited.

After step 504, process 500 includes a step 506 of carburizing the steel rolling element at a maximum temperature of 955° C. For example, carburizing may be performed in a temperature range of 830° C. to 955° C. In one direct quench carburization method, the carburizing may be performed in three heating segments as follows: 1) 900° C.-955° C. in a carbon environment of 1.0-1.2 carbon potential for 4-15 hours, 2) 860° C.-930° C. in a carbon environment of 0.75-1.0 carbon potential for 1-5 hours, and 3) 830° C.-860° C. in a carbon environment of 0.7-1.0 carbon potential for 0.5-1.5 hours. This step may be immediately followed by quenching to 25° C.-130° C. The manner or method by which the low carbon steel rolling element is carburized is not particularly limited, so long as the carburization imparts a suitable amount of carbon onto the steel rolling element, e.g., vacuum carburization, gas carburization, etc. For example, carburization step 506 may entail the steel rolling element being heated in an atmosphere with carbon potential. As a result, the carbon from the atmosphere may diffuse into the surface to a depth of 0.5 mm to 3.0 mm such that a weight percent of carbon is 0.35% C or above at the "carburized depth." The atmosphere, in which the steel rolling element is carburized, may be, for example, a hydrocarbon atmosphere. The hydrocarbon atmosphere may include, but is not limited to, carbon monoxide, hydrogen, carbon dioxide, and hydrocarbons, such as methane, and may contain nitrogen as well as water vapor.

Process 500 includes a subsequent step 508 of cooling the carburized steel rolling element via quenching. The manner by which the carburized steel rolling element is quenched is not particularly limited, and may be, for example, via oil quenching. The carburized steel rolling element may be quenched, until it achieves a hardness of HRC 61-65 and a hardened depth of 0.5-3.0 mm. As a result of the quenching, a carburized layer, having a depth of 0.5 mm to 3.0 mm, may have a weight percent of carbon that is at least 0.35% C.

Process 500 also includes a final step 510 of tempering the carburized steel rolling element at a temperature from about 150° C. to around 200° C. Tempering at 150° C. to 200° C. may lower the hardness of the rolling element from a hardness of HRC 61-65 to a hardness of HRC 59-63. The final hardness of the rolling element may be in a hardness range of HRC 59-63.

The carburized steel rolling element produced by process 500 may have a hardness of HRC 59-63 measured at the surface and a hardened depth of 0.5 mm to 3.0 mm. In aspects of the present disclosure, a hardened depth may constitute the depth from the surface of the rolling element where the hardness is over HRC 50 as well as the depth for which the carbon content of the rolling element may be at or above 0.35% C. Thus, process 500, as disclosed above, may provide the steel rolling element a carburized layer having a plurality of characteristics and properties that enhances the layer's functionality, e.g., hardness, surface contact fatigue lifespan, and wear resistance. The enhanced functionality may also increase the wear resistance of a roller cone bit (e.g., tricone bit) containing a plurality of said rolling elements. Thus, after manufacture, the above described rolling elements may be used in bearing assemblies of a tricone bit.

In an alternative embodiment of process 500 of the present disclosure, a low carbon bearing steel material may be processed according to steps 502, 504, and 506 of process 500 and may include a cooling step and a reheating step prior to the quenching and final tempering step according to the conditions of step 508 and 510, respectively, of process 500. Following the carburization, which may occur in carburization heating segments, a first cooling step may include slowly cooling the carburized steel rolling element or quickly cooling the carburized steel rolling element. The manner by which the carburized steel rolling element is cooled is not particularly limited, and may be, for example, via quenching. After the cooling, a reheat hardening step may take place where the rolling element may be heated to 760° C. to 860° C. at a carbon potential of 0.70 to 1.0 for 0.5 to 2 hours. This step may be immediately followed by quenching to 25° C.-130° C. as practiced in step 508 of process 500. The quenched carburized steel rolling element may achieve a surface hardness of HRC 59-65 and a hardened depth of 0.5 mm to 3.0 mm. Thus, the alternative to process 500 may also provide the steel rolling element a carburized layer having a plurality of characteristics and properties that enhances the layer's functionality, e.g., hardness, surface contact fatigue lifespan, and wear resistance. The enhanced functionality may also increase the wear resistance of a roller cone bit (e.g., tricone bit) containing a plurality of said rolling elements. Thus, after manufacture, the above described rolling elements may be used in bearing assemblies of a tricone bit.

Figure 6:
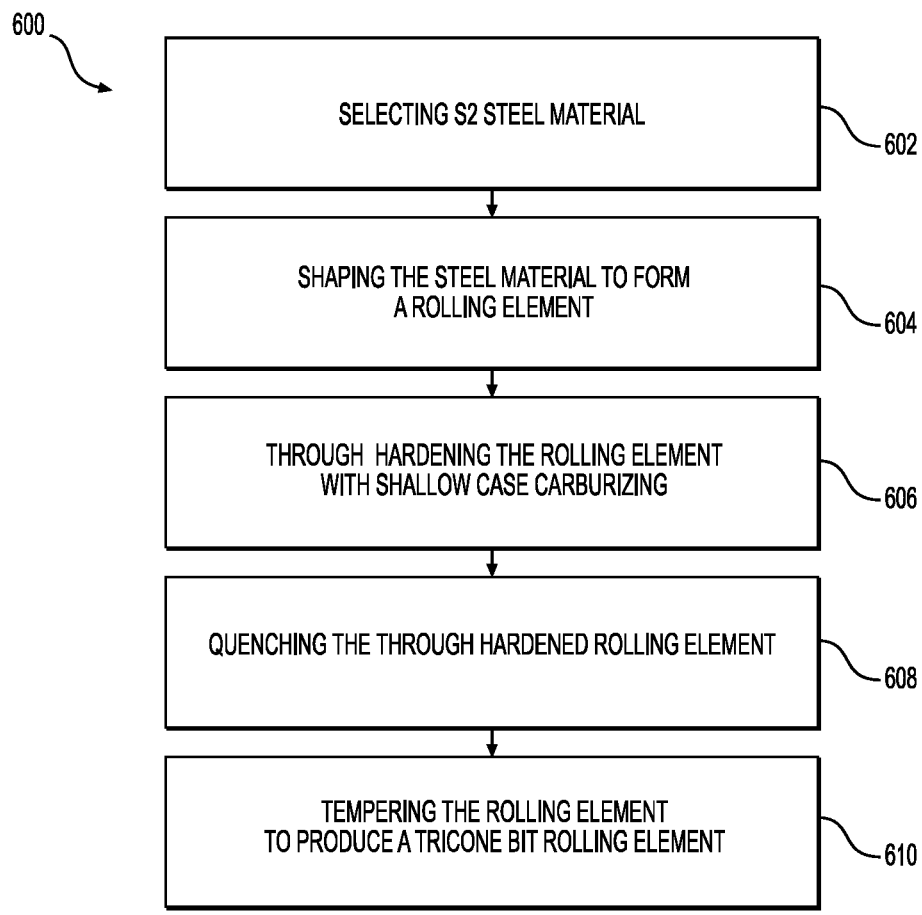
FIG. 6 provides a flowchart depicting a second exemplary process for preparing rolling elements for a tricone bit, according to aspects of this disclosure.

FIG. 6 is a flow diagram portraying an exemplary heat treatment-through hardening process 600 that may be performed to heat treat a steel rolling element, such as roller 400A of FIG. 4A or ball 400B of FIG. 4B.

Process 600 includes a step 602, in which an initial, base steel material is selected. In process 600, an S2-shock absorbing tool steel material may be selected for treatment. For example, the S2 material may have a composition, by weight percentage, as presented in Table 2 below:

TABLE 2

Chemical Composition of S2 tool steels

| | |
|---|---|
| Carbon (C) | 0.4%-0.55% |
| Manganese (Mn) | 0.30-0.50% |
| Silicon (Si) | 0.90-1.20% |
| Sulfur (S) | 0%-0.03% |
| Molybdenum (Mo) | 0.30-0.60% |
| Vanadium (V) | 0%-0.5% |
| Phosphorus (P) | 0%-0.03% |
| Iron (Fe) | 97.0% |

Process 600 also includes a step 604, in which the S2 steel material is shaped to form a rolling element, such as roller 400A of FIG. 4A or ball 400B of FIG. 4B. The manner or mechanism by which the steel material is shaped is not particularly limited.

After step 604, process 600 includes a step 606 of through hardening with shallow case carburizing the steel rolling element at a temperature of 850° C. to 900° C. For example, through hardening with shallow case carburizing step 606 may entail the steel rolling element being heated in an atmosphere with carbon potential. The atmosphere, in which the steel rolling element is through hardened, may be, for example, a hydrocarbon atmosphere. The hydrocarbon atmosphere may include, but is not limited to, carbon monoxide, hydrogen, carbon dioxide, and hydrocarbons, such as methane, in addition to nitrogen and water vapor. In step 606, the carbon potential may be 0.6-1.0, such that the carbon may infuse into the surface of the steel rolling element allowing for shallow case carburizing. As a result of step 606, the steel rolling element is hardened throughout, from the surface to the core, wherein the surface may have a slightly elevated hardness over the first 0.3 mm to 0.6 mm of depth from the surface. In some aspects of the present disclosure, the core may have a hardness of HRC 54-57. In preferred embodiments, the core may have a hardness of HRC 56-59. Without being bound by theory, it is believed that the surface depth may allow for some finish grinding of the surface providing surface finish and dimensional control, while still finishing with a surface hardness of HRC 58-63.

Process 600 includes a subsequent step 608 of cooling the through hardened steel rolling element via quenching. The manner by which the through hardened steel rolling element is quenched is not particularly limited, and may be, for example, via oil quenching. The through hardened steel rolling element may be quenched, until it achieves a hardness of HRC 59-65.

Process 600 also includes a final step 610 of tempering the through hardened steel rolling element at a temperature from about 150° C. to around 250° C. The tempering step in the range of 150° C. to around 250° C. may lower the surface hardness to a hardness of HRC 58-63. Further, in some embodiments, a second tempering step may be performed.

The through hardened and shallow case carburized steel rolling element produced by process 600 may have a surface hardness of HRC 58-63. In addition, the core of the rolling element may maintain a relatively high toughness advantage of the S2 material in a hardness range, such as HRC 56-59. Thus, process 600, as disclosed above, may provide the steel rolling element that has been through hardened with shallow case carburizing having a plurality of characteristics and properties that enhances the steel rolling element's functionality, (e.g., hardness, surface contact fatigue lifespan, wear resistance) throughout. The enhanced functionality may also increase the wear resistance of a roller cone bit (e.g., tricone bit) containing a plurality of said rolling elements. Thus, after manufacture, the above described rolling elements may be used in bearing assemblies of a tricone bit.

Figure 7:
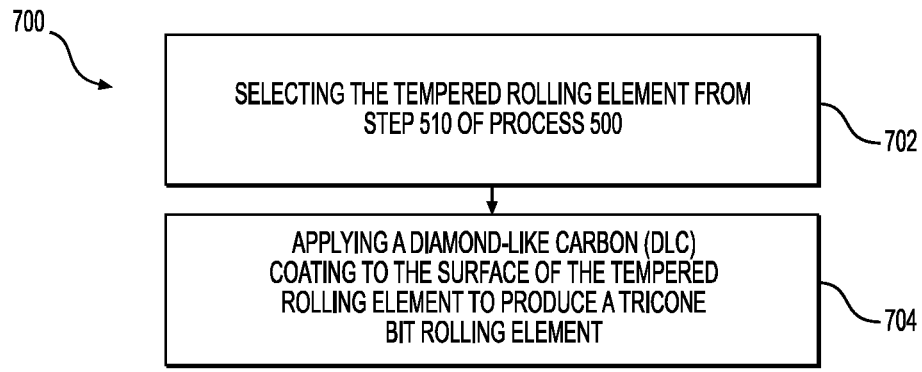
FIG. 7 provides a flowchart depicting a third exemplary process for preparing rolling elements for a tricone bit, according to aspects of this disclosure.

FIG. 7 is a flow diagram portraying an exemplary diamond-like carbon coating process 700 that may be performed to coat a steel rolling element, such as roller 400A of FIG. 4A or ball 400B of FIG. 4B, which has been heat treated via carburization according to process 500 of FIG. 5.

Process 700 includes a step 702, in which a tempered steel rolling element from process 500 is selected. Therefore, once a steel rolling element, such as roller 400A or ball 400B, has been subjected to process 500, the steel rolling element from the final step 510 may be used in process 700. Because the steel rolling element has been subjected to process 500, the steel rolling element selected for process 700 may have a hardness of HRC 59-63 at the surface and a hardened depth of 0.5 mm to 3.0 mm. After the tempered steel rolling element is selected in step 702, step 704 may be conducted.

In step 704, a diamond-like carbon (DLC) coating is applied to the surfaces of the steel rolling element by chemical vapor deposition. The DLC coating may comprise an amorphous diamond-like carbon layer, a tungsten diamond-like carbon matrix layer, and/or a chrome nitride layer. It is understood that the DLC coating may comprise one or more layers including any combination of the three layers as disclosed above. For instance, in some embodiments, the DLC coating comprises three different layers. The first layer may be an amorphous diamond-like carbon layer. The second layer may be a tungsten diamond-like carbon matrix and the third layer may be a chrome nitride layer. The one or more layers are deposited together as one layer, onto the surface of the steel rolling element to form a thin film DLC coating. The DLC coating layer, which may be adjacent to the surface of the steel rolling element, may have a thickness of less than 25 microns, preferably from 2 microns to 5 microns.

Thus, process 700, as disclosed above, may provide the steel rolling element with a diamond-like carbon coating layer having a plurality of characteristics and properties that may be attributed to the amorphous diamond (e.g., hardness), in addition to the carburized layer beneath. After manufacture, the above described rolling elements may be used in bearing assemblies of a tricone bit.

INDUSTRIAL APPLICABILITY

In view of the above aspects of the present disclosure, it is possible to manufacture and thus obtain, a roller cone drill bit, such as a tricone bit, comprising carburized, through-hardened and shallow case carburized, or DLC coated and carburized steel rolling elements that may better withstand forces that cause unfavorable wear, pitting, spalling, etc. The carbide precipitation, surface hardness in ranges of HRC 59-63 or HRC 58-63, and high impact toughness core, among other characteristics of carburized and through hardened rolling elements may be of particular benefit in steel rolling elements in a tricone bit that commonly have contact fatigue and wear. This is because the aforementioned characteristics help enhance surface contact fatigue performances of through hardened and shallow case carburized, carburized, and/or DLC coated and carburized steel rolling elements within tricone bits.

As a result, the above described roller cone drill bit rolling elements may have longer surface contact fatigue lifespans and higher wear resistance, despite being exposed to similar wear forces. Furthermore, the rolling elements of the present disclosure may also decrease the likelihood of mechanical failure of tricone bits, engineering bits, and other roller cone drill bits employing such rolling elements. Moreover, the use of low carbon bearing materials, such as low carbon, low alloy steel may result in roller cone drill bits containing cost effective rolling elements. Further, carburizing low carbon, low alloy steel results in a relatively low cost as compared to bearing materials of a higher cost, while still imparting the increased wear resistance, durability, and strengthening properties. Accordingly, the present disclosure has significant industrial applicability.

It will be apparent to those skilled in the art that various modifications and variations can be made to the disclosed machine without departing from the scope of the disclosure. Other embodiments of the control system for a machine will be apparent to those skilled in the art from consideration of the specification and practice of the control system for a machine disclosed herein. It is intended that the specification and examples be considered as exemplary only, with a true scope of the disclosure being indicated by the following claims and their equivalents.

The invention claimed is:

1. A roller cone drill bit comprising:
a plurality of rolling elements within a bearing assembly of a cone;
wherein each rolling element of the plurality of rolling elements has a surface hardness of HRC 59-63, a hardened depth that is 0.5 mm to 3.0 mm deep, and is derived from a low carbon bearing steel material;
wherein the hardened depth is measured from the surface of each rolling element; and
wherein the low carbon bearing steel material has, by weight percent, from 0.12% to 0.25% carbon;
wherein the hardened depth comprises a carburized layer having a carbon content of at least 0.35% by weight at a depth of 0.5 mm to 3.0 mm from the surface of each rolling element.

2. The roller cone drill bit of claim 1, wherein the low carbon bearing steel material has, by weight percent, from 0.0 to 1.40% nickel.

3. The roller cone drill bit of claim 1, wherein the low carbon bearing steel material has, by weight percent, greater than 0.015% aluminum.

4. The roller cone drill bit of claim 1, wherein the low carbon bearing steel material has, by weight percent, less than 0.4% silicon.

5. The roller cone drill bit of claim 1, wherein the roller cone drill bit comprises at least one leg assembly and three cones.

6. The roller cone drill bit of claim 1, wherein the roller cone drill bit is a tricone drill bit.

7. The roller cone drill bit of claim 1, wherein each rolling element of the plurality of rolling elements further comprises a diamond-like carbon coating on the surface of each rolling element.

8. The roller cone drill bit of claim 7, wherein the diamond-like carbon coating on the surface of each rolling element has a thickness of less than 25 microns.

9. A method of increasing the wear resistance of a roller cone drill bit, the method comprising:
adding a plurality of rolling elements to a bearing assembly within at least one cone of the roller cone drill bit;
wherein each rolling element of the plurality of rolling elements has a surface hardness of HRC 59-63, a hardened depth that is 0.5 mm to 3.0 mm deep, and is derived from a low carbon bearing steel material;
wherein the hardened depth is measured from the surface of each rolling element; and
wherein the low carbon bearing steel material has, by weight percent, from 0.12% to 0.25% carbon;
wherein the hardened depth comprises a carburized layer having a carbon content of at least 0.35% by weight at a depth of 0.5 mm to 3.0 mm from the surface of each rolling element.

10. The method of claim 9, wherein at least one rolling element further comprises a coating.

11. A roller cone drill bit comprising:
a plurality of rolling elements within a bearing assembly of a cone;
wherein each rolling element of the plurality of rolling elements has a surface hardness of HRC 58-63, a core hardness of HRC 56-59, a hardened depth that is 0.5 mm to 3.0 mm deep, and is derived from a low carbon bearing steel material;
wherein the hardened depth is measured from the surface of each rolling element; and
wherein the low carbon bearing steel material has, by weight percent, from 0.40% to 0.55% carbon.

* * * * *